April 19, 1927.
F. J. MALONE
1,625,127
MILLING MACHINE FOR DESEAMING BILLETS
Filed Oct. 21, 1922    4 Sheets-Sheet 3
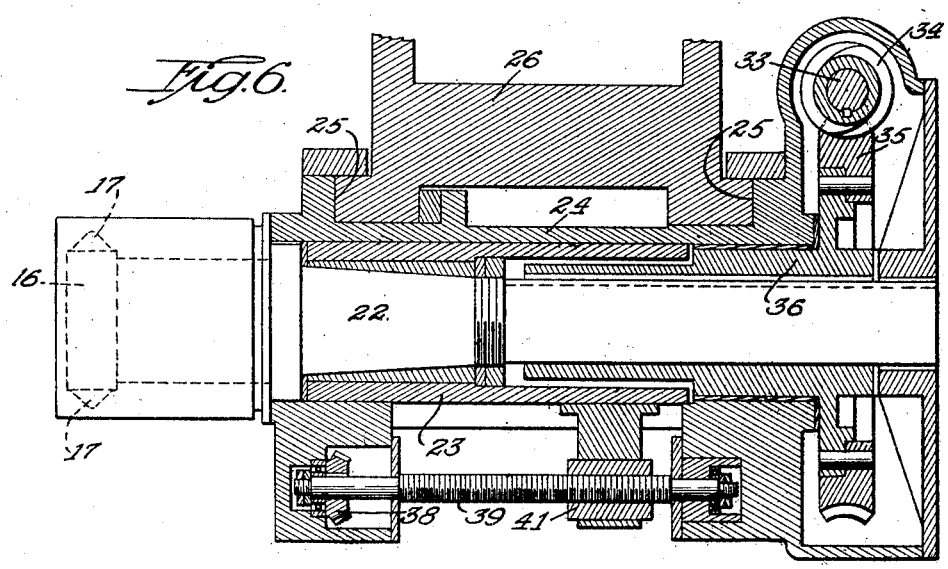
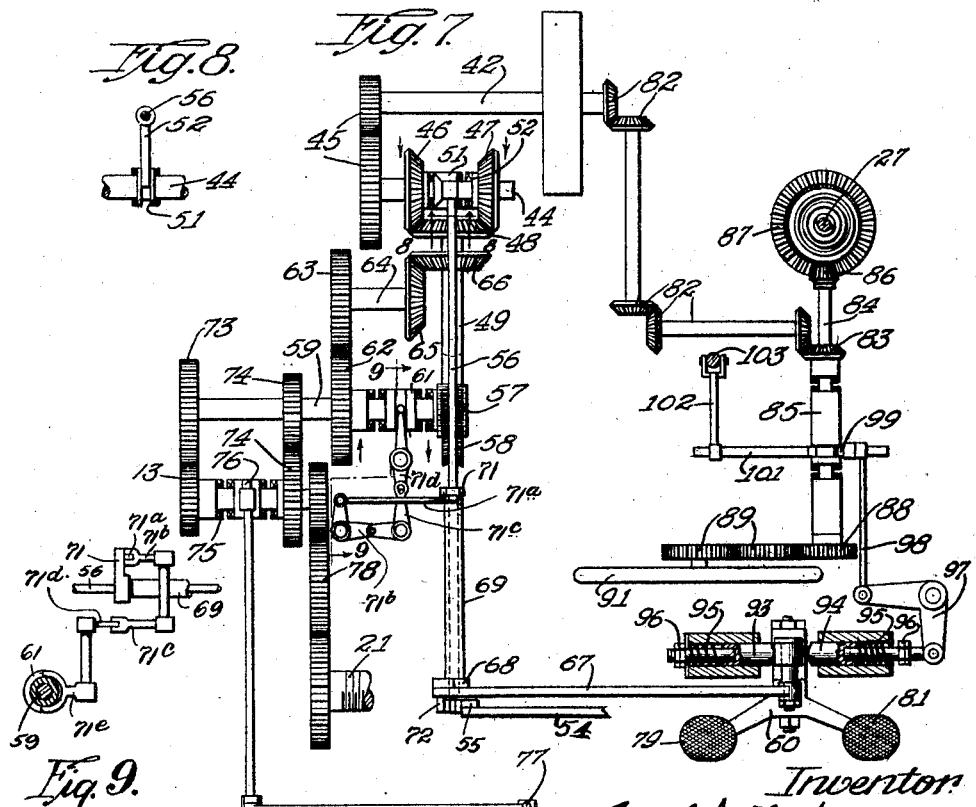

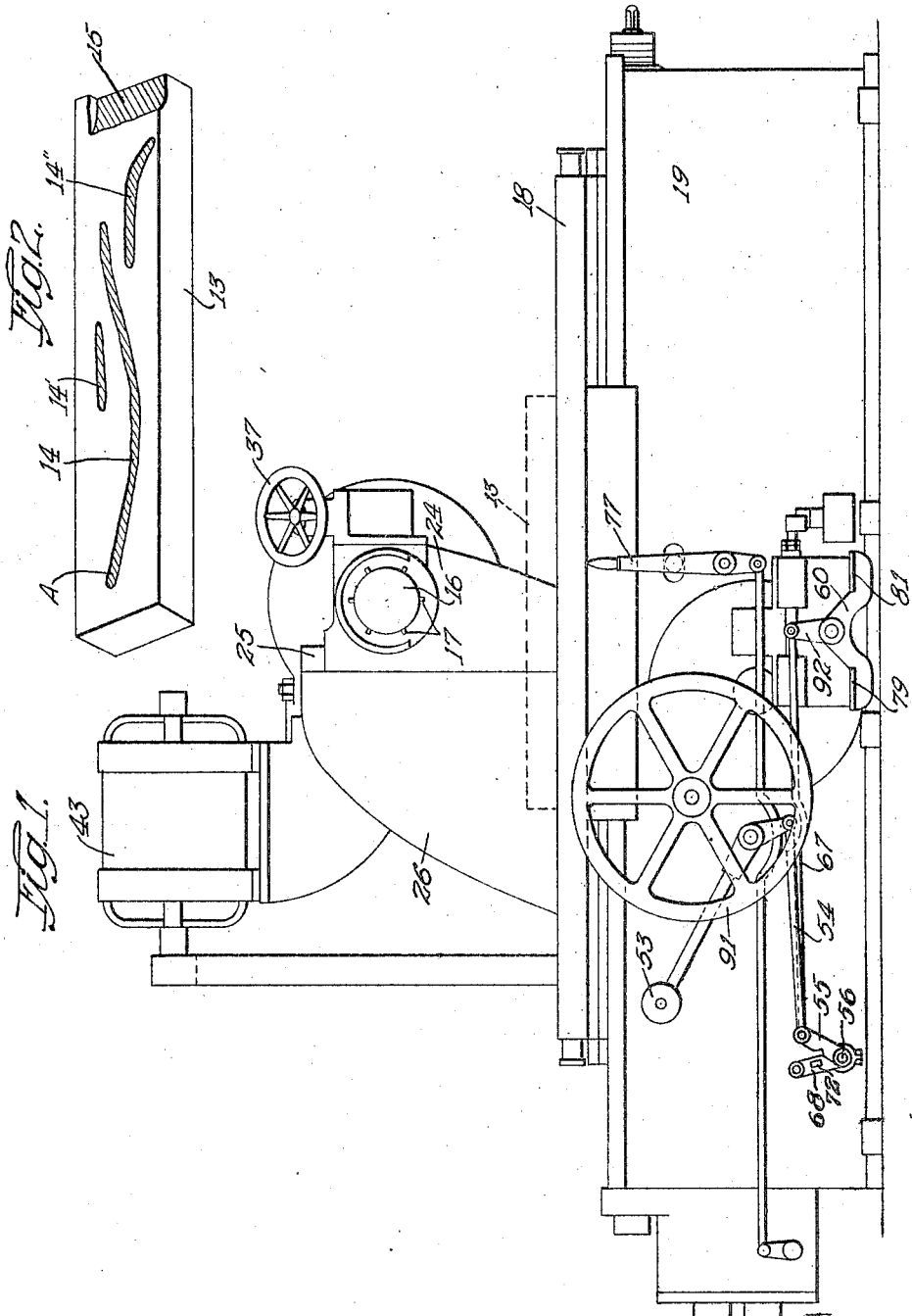

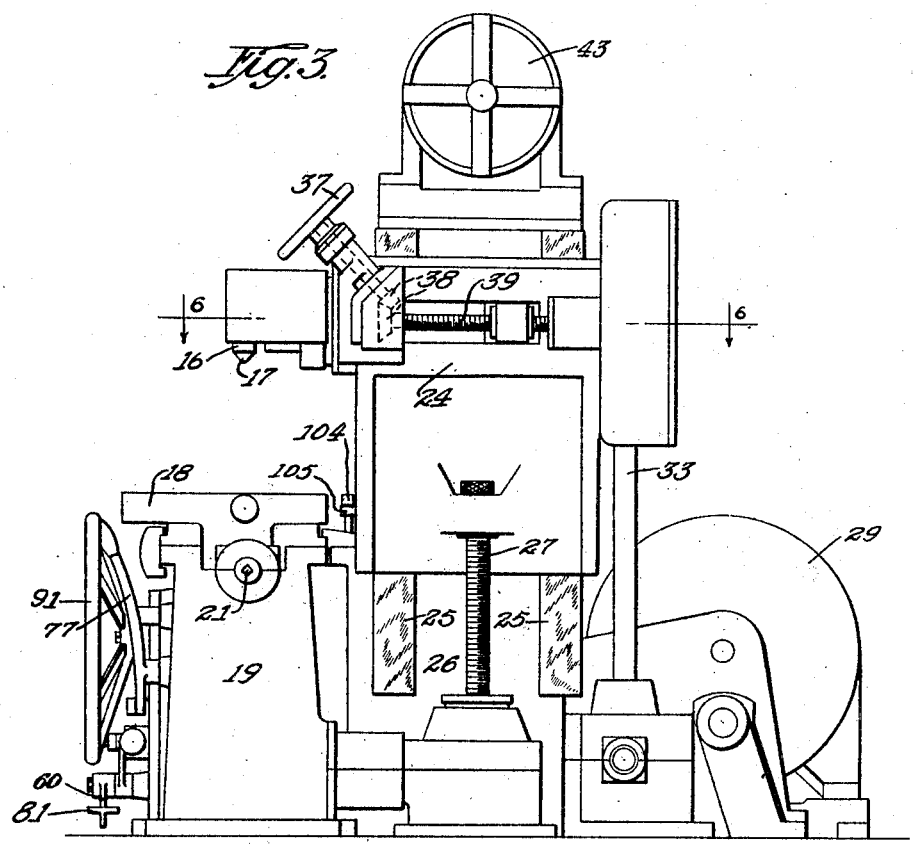
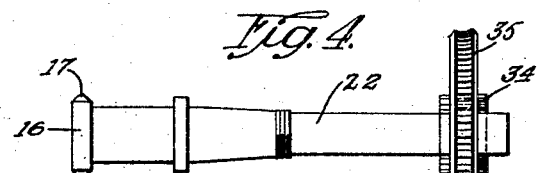
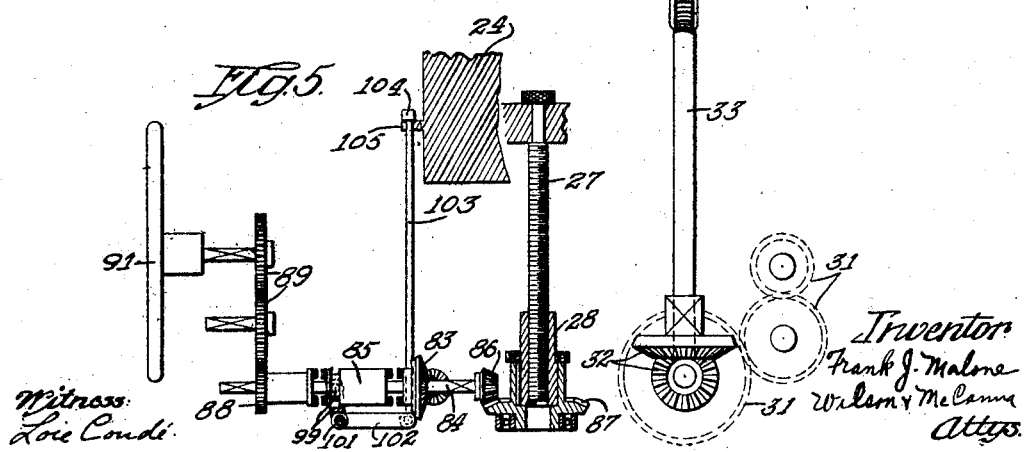

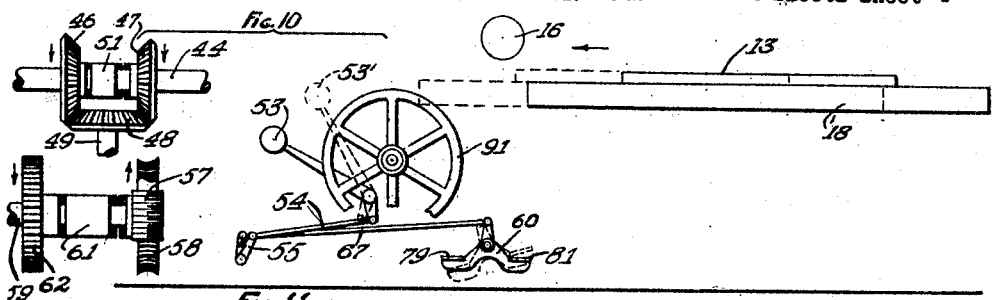
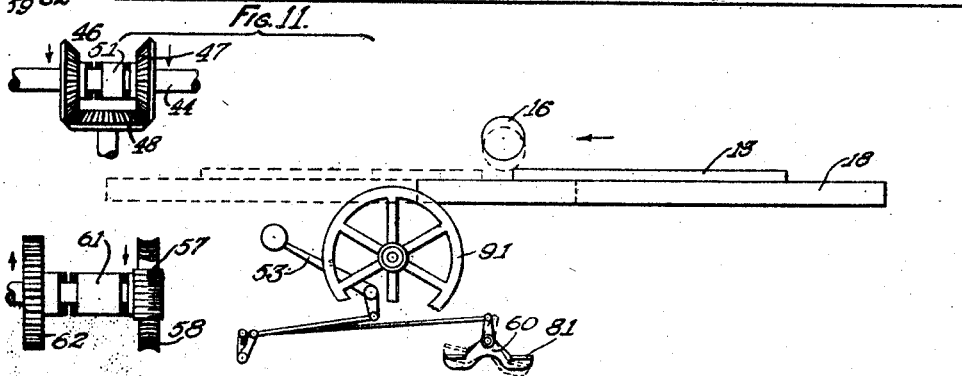
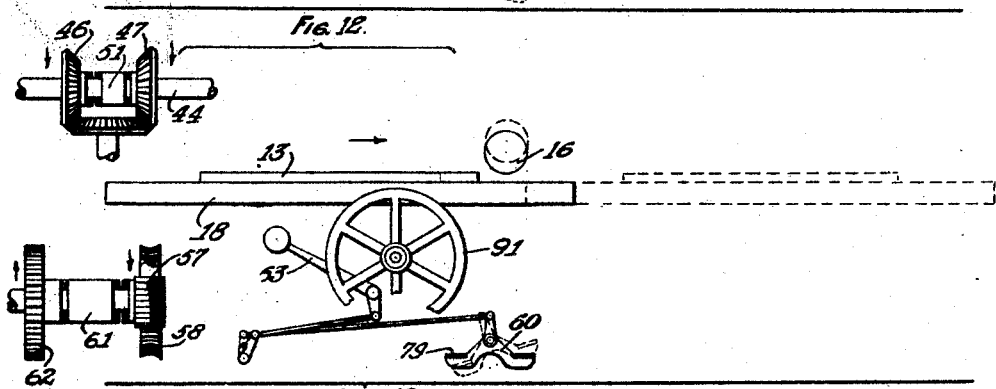
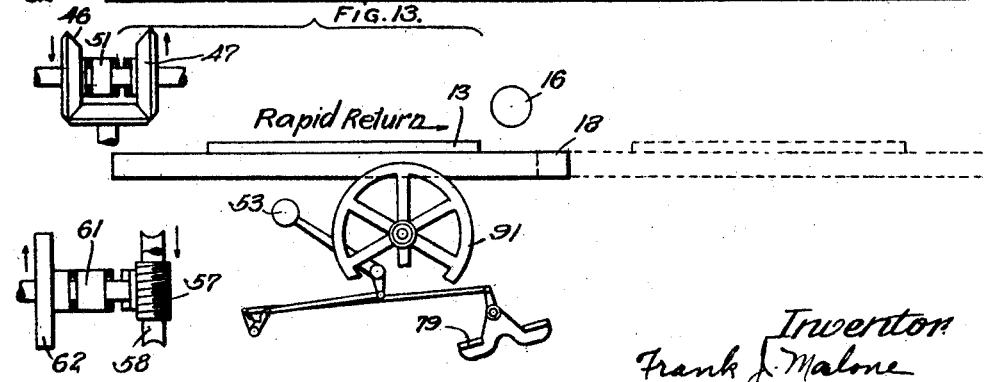

Patented Apr. 19, 1927.

1,625,127

UNITED STATES PATENT OFFICE.

FRANK J. MALONE, OF ROCKFORD, ILLINOIS, ASSIGNOR TO THE INGERSOLL MILLING MACHINE COMPANY, OF ROCKFORD, ILLINOIS, A CORPORATION OF ILLINOIS.

MILLING MACHINE FOR DESEAMING BILLETS.

Application filed October 21, 1922. Serial No. 595,957.

This invention pertains in general to milling machines, and has more particular reference to a special-purpose machine for deseaming steel billets and the like. By "deseaming" I mean cutting from the surface of a billet the seams, creases or any spots or portions of the metal which must be removed before working the steel. Heretofore, these seams, etc., have been chipped out by hand and with the aid of air hammers, or they have been gouged out with a portable hand operated tool having a power driven cutter. These methods are, however, slow, laborious and costly.

The primary object of the present invention is to provide means for expediting the de-seaming operations, and to this end I have provided a special purpose milling machine by which such operations may be performed in much less time and at a lower cost than heretofore.

Another object is to provide a machine of the character described which will be convenient and easy to operate and will be practically fool-proof, so that comparatively unskilled labor may be employed for operating the machine.

In furtherance of the foregoing, I have provided a machine characteriezd by a reciprocable table upon which a work-piece in the form of a steel billet is traveled back and forth beneath a rotary milling cutter, and mechanism under the control of a single operator for moving the work table in rapid approach, feed and rapid traverse movements for preventing the cutter from being fed into the work-piece during the rapid speed of the table, and for automatically withdrawing the cutter from the work-piece upon reversing the table motion upon completion of the milling operation.

My invention also contemplates the provision of manually operable means for feeding the cutter into the work-piece, and power-operated means for withdrawing the cutter. It also provides simple control means whereby the hand and power-operated means for moving the cutter are automatically rendered operative and inoperative upon changing the speed and direction of travel of the work table, to the end that the cutter may be fed into the work only when the work-piece is traveling at the feed speed and will be automatically withdrawn from the work upon engaging the rapid reverse speed for returning the table to the starting position.

I have also aimed to provide a machine of simple construction which will be thoroughly practical and serviceable for performing the de-seaming operations described, and any milling operations of the character referred to hereinafter.

Other objects and attendant advantages will be appreciated by those skilled in this art as the invention becomes better understood by reference to the following description when considered in connection with the accompanying drawings, in which—

Figure 1 is a front elevation of a milling machine embodying my invention;

Fig. 2, a perspective view of a steel billet after it has been de-seamed by the present machine;

Fig. 3 is an end view of the machine;

Fig. 4 is a diagrammatic view illustrating the cutter spindle drive;

Fig. 5 is a gear chart showing the hand and power-operated means for raising and lowering the cutter spindle saddle;

Fig. 6 is a horizontal sectional view taken substantially on the line 6—6 of Fig. 3;

Fig. 7 is a diagrammatic gear chart illustrating the mechanism for propelling the work table and for raising and lowering the cutter spindle saddle and also including part of the control mechanism;

Figs. 8 and 9 are detail sections taken substantially on the lines 8—8 and 9—9, respectively, of Fig. 7; and Figs. 10, 11, 12 and 13 are groups of fragmentary diagrammatic views illustrating different positions of the control members and the operations produced thereby.

The steel billets such as designated by 13 are of various dimensions, but are generally elongated and rectangular in cross section. The seams or other spots which must be cut out of the surface of the metal generally run lengthwise of a billet and are sometimes very irregular in size and shape. In the example shown, seams 14, 14′ and 14″ have been removed by a relative lengthwise feed movement between the milling cutter and billet and the spot 15 at one end has been removed by lateral feed of the cutter. The milling cutter 16 employed for these deseaming operations may be of any suitable construction; but I prefer to employ one of the inserted-tooth type in which the teeth 17 have a cone profile as shown.

A billet to be de-seamed will be clamped or otherwise secured at a central position on a work-carrying table 18 which is mounted to reciprocate horizontally on a suitable bed or frame designated generally by 19. A conventional feed screw 21 operating in a nut on the table is employed at present for traveling the work table back and forth on the bed.

The milling cutter 16 is carried by a horizontal spindle 22, Fig. 6, which revolves in a quill 23 mounted to slide axially in a saddle 24. This saddle mounted to slide vertically on ways 25 on the upright housing 26 at the rear side of the bed 19, is adapted to be raised and lowered on said ways by means of a screw 27 and nut 28, as will be explained more fully hereinafter. The cutter spindle 22 is adapted to be continuously driven while the machine is in operation by an electric motor 29 through the agency of suitable reduction gearing, including the spur gears 31 and the bevel gears 32, which drive a vertical shaft 33 equipped with a worm 34 in mesh with a worm gear 35 fixed to a sleeve 36 in which the spindle is splined. The cutter spindle may be fed axially to move the cutter laterally with respect to the work by suitable means such for example as a hand wheel 37, connected by bevel gears 38 to a screw 39 operating the nut 41 fixed to the quill 23. From the foregoing it will be manifest that the cutter spindle suitably mounted for operation directly above the work table, is adapted to be continuously revolved and to be raised and lowered and fed laterally with respect to the table.

In regard to propelling the work table, my invention contemplates the provision of suitable mechanism for traversing the table in opposite directions at a comparatively rapid speed known as rapid approach, for bringing the work-piece into proximity to the cutter, and rapid reverse for returning the work-piece to the starting position after completion of the milling operation, and at a slower speed known as the feed, during which the milling operation is performed. At present I employ a train of gearing with interposed clutches for producing these table movements, which gearing and clutches will now be described. As shown in Fig. 7, the shaft 42 driven by a belt and pulley from an electric motor 43, Fig. 1, drives a shaft 44 through the agency of spur gears 45. Either of a pair of bevel gears 46 and 47, loose on the shaft 44 and meshing with an intermediate gear 48 fixed to a shaft 49, is adapted to be connected to the shaft 44 by a toothed clutch element 51 splined on said shaft and movable by a shifting fork 52 into and out of engagement with complemental clutch teeth on said gears. A weighted hand lever 53 at the front of the machine is connected to said shifter arm 52 by a link 54, arm 55 and rock shaft 56. Said hand lever normally occupies the position shown in Fig. 1, in which the gear 46 is clutched to the shaft 44, as shown in Fig. 7. The shaft 49 carries a worm 57 in mesh with a worm gear 58 loose on a shaft 59 and adapted to be connected thereto by a toothed clutch element 61 splined on said shaft 59. Said clutch element is also adapted to connect to said shaft 59, a spur gear 62 loose on the shaft and meshing with a gear 63 fixed to a shaft 64, which carries a fixed bevel gear 65 meshing with a bevel gear 66 fixed to the shaft 49. The clutch element 61 is adapted to be shifted by operation of a foot lever at the front of the machine, designated generally by 60, said lever having oppositely disposed foot treadles 79 and 81. When the foot treadle 79 is depressed it will shift the clutch element 61 into engagement with the gear 62 and when the foot treadle 81 is depressed it will shift said clutch element 61 into engagement with the gear 58. Any suitable connection between the lever 60 and said clutch element 61 may be provided for this purpose. At present it consists of (Figs. 7 and 9) a link 67 connecting said lever 60 and an arm 68 fixed to a sleeve or rock shaft 69 loose on the shaft 56, and a suitable motion train between the sleeve 68 and said clutch element 61. This motion train comprises an arm 71 fixed to the sleeve 68, a link $71^a$ connecting said arm 71 and a bell-crank lever $71^b$, and an oppositely positioned bell-crank lever $71^c$ connecting said lever $71^b$ and a lever $71^d$ which in turn is connected to a fork $71^e$ which shifts the clutch element 61. Said motion train is constructed as disclosed merely because of the position of the operating arm 71 with respect to the clutch element 61 and for the purpose of showing a complete organization of parts in a gear chart. The arm 68 carries a forwardly projecting lug 72 disposed in the path of the arm 55 and adapted to be engaged by the latter for rocking the sleeve 69 in a counter-clockwise direction viewing Figs. 1 and 9 when said shaft 56 is similarly rocked by swinging the lever 53 in a clockwise direction for the purpose explained hereinafter. Change speed gearing is provided between the shaft 59 and the table feed screw 21 consisting of two pairs of gears 73 and 74 of different ratios, either of which is adapted to be connected to the shaft 75 by means of a toothed clutch element 76 operated by a change speed lever 77 at the front of the machine. The shaft 75 connects to the feed screw 21 by gearing 78. The gearing above described between the driving shaft 42 and the table feed screw 21, shown in the gear chart Fig. 7, may be suitably mounted, at present in casings positioned at the rear and left hand end of the machine with reference to Fig. 1.

By means of the foregoing gearing and clutches, rapid and feed movements may be imparted to the work table. In the idle position before starting, the control levers will occupy the positions shown in Fig. 1. To start the machine the hand lever 77 will be shifted to connect either set of gears 73 or 74 in the train of drive. Assuming that both driving motors are in operation and that the table 18 is at the right hand end of the bed, as shown in Fig. 10, the clutch element 51 will be engaged with the gear 46 and the clutch element 61 will be in the neutral position as shown in Fig. 7. The gears 46, 47, 58 and 62 will revolve in the direction indicated by the arrows, Fig. 7, said arrows indicating the direction of travel at the near side of the gears. To advance the work-piece to the cutter in the rapid approach movement, the operator raises the hand lever 53 to the full line position 53' shown in Fig. 10, thereby engaging the clutch element 51 with the gear 47, and the clutch element 61 with the gear 62, as shown in Fig. 10, and feeding the table forwardly at the rapid speed. It will be noted that in raising the hand lever 53 the arm 55 will contact the lug 72, move the arm 68 to the left, and move the motion train 71—71ᵉ, above described, so as to shift the clutch element 61 to the left when the clutch element 51 is shifted to the right. When the work-piece approaches within close proximity to the cutter, the operator drops the lever 53, thereby disengaging the clutch element 51 from the gear 47 and engaging it with the gear 46 so as to reverse the rotation of the gears 58 and 62 as noted in Fig. 11 by the arrows, and withdrawing the arm 55 from the lug 72 so as to permit the lever 60 to return to its normal position, leaving the clutch element disengaged or in a vertical position. This discontinues the table drive and the table will stop. Upon depressing the treadle 81 of the foot lever 60 in the manner shown in Fig. 12, only the clutch element 61 will be shifted to connect the slow moving worm gear 58 to the shaft 59, thereby propelling the table forwardly at the slow or feed speed, it being noted that the gear 58 always revolves in the opposite direction from the gear 62, but that by shifting the reversing clutch 51, the worm gear 58 revolves in the same direction during the feed speed as the gear 62 during the rapid approach speed, consequently propelling the table forwardly. After the milling operation has been completed, the operator may return the work table to the starting position in a rapid reverse movement by depressing the foot treadle 79, as shown in Fig. 13, thereby shifting the clutch element 61 into engagement with the gear 62, which revolving in the opposite direction from the worm gear 58 and at a faster speed, produces the rapid reverse movement. To stop the table the operator withdraws his foot from the treadle 79 and the lever 60 will be returned to neutral position as will be explained more fully hereinafter.

The foot lever 60 also controls the operativeness of a hand and a power operated means for raising and lowering the spindle saddle, as will now be explained. Referring more particularly to Fig. 7, it will be seen that the shaft 42 drives through intermediate bevel gears and shafting 82, a bevel gear 83 loose on a shaft 84 and adapted to be connected thereto by a toothed clutch element 85 splined on said shaft 84. A bevel gear 86 fixed to said shaft 84 meshes with a bevel gear 87 fixed to the nut 28 mentioned above, so that when the gear 83 is clutched to the shaft 84 the latter will be driven by power from the shaft 42 for revolving the screw 27 in a direction to raise the spindle saddle. When the clutch element 85 is shifted in the opposite direction, it will clutch to the shaft 84, a gear 88 loose thereon and connected by gears 89 to a hand wheel 91 at the front of the machine. This wheel 91 may be rotated by hand for raising and lowering the spindle saddle and for feeding the cutter into and out of the workpiece, but this operation by the hand wheel may be performed only while the table is being propelled at the feed speed, or when the table is idle, as will be presently more fully explained. Said clutch element 85 is adapted to be shifted by operation of the foot lever 60 in the following manner. Said foot lever has an upstanding arm 92 disposed between two plungers 93 and 94 supported in stationary housings. Each plunger is urged toward said upstanding arm by a compression spring 95 and is limited in its approach to said arm by an adjustable stop nut 96. The plunger 94 connects to a bell crank lever 97 which is connected by a link 98 to a yoke 99 for shifting the clutch element 85. Said yoke is fixed to a rock shaft 101 to which is fixed an arm 102 connected to a rod 103, the upper end of which carries a head 104 adapted to be actuated by a stop 105 on the spindle saddle for disconnecting the clutch element 85 from the gear 83 as will be presently explained. By means of the foregoing mechanism, the hand wheel 91 will be connected to the shaft 84 by depression of the treadle end 81 of the foot lever 60. This renders operative the hand operable means for feeding the cutter downwardly into the work, although the spindle saddle may be vertically adjusted by means of the hand wheel when the work table is at rest, that is, when the lever 77 has been moved to the neutral position and the foot treadle 81 depressed. In other words, as long as the treadle 81 is depressed so that the table is either propelled at the feed speed or is stationary, the cutter may be raised and lowered by manual operation of the wheel 91. As soon as the treadle 81 is released the plunger 94 will be forced to the left by the pressure stored in the compressed spring 95, thereby throwing the foot lever 60 to a neutral position and throwing the clutch element 85 into engagement with the power-driven gear 83. This revolves the shaft 84 in such direction as to elevate the cutter spindle saddle in a quick movement, although in actual practice it is only necessary to elevate the cutter about one inch in order to remove the cutter a safe distance above the work-piece.

The operation of the machine is as follows: The operator stands directly in front of the machine so that with the left hand he may operate the lever 53 and the hand wheel 91, and with the right hand, the hand wheel 37 and the lever 77. Being directly in front of the machine, the operator may conveniently operate the foot lever 60 without moving from the hand controls. Assuming that the billet to be milled is that shown in Fig. 2, and that it is properly clamped onto the table, the latter will be advanced in the rapid approach movement to bring the billet into proximity to the cutter, this being done by raising the lever 53 as explained above, and then dropping it to stop the table. The operator will then depress the foot treadle 81, thereby propelling the table to the left at the slow feed movement, and at the same time rendering the hand operated means operative for lowering the cutter into the work. The operator by manipulating the hand wheels 91 and 37 and with his foot on the treadle 81, lowers the cutter and adjusts it laterally so that it enters the billet at the point A. By feeding the cutter down to proper depth and then causing, by manipulation of the wheel 37, the cutter to follow the contour of the seam 14, the latter may be completely milled out. It will be noted that no power-operated means is provided for feeding the cutter into the work aside from the power feed of the table; and that the cutter can in no way be entered into the work until the table is propelled at the slow feed speed, thus preventing accidents which might be caused by jamming the cutter into the work at more rapid speed than the capacity of the cutting tool will allow. Upon finishing this milling operation, the operator simply releases the foot treadle 81, whereupon the spindle saddle will be immediately elevated by the power-operated means above described, until stopped by the stop member 105. Upon releasing the treadle 81 the feed of the table will likewise be stopped. By depressing the foot treadle 79, the table will be returned at the rapid speed to the starting position, and upon releasing said treadle the spring-pressed plunger 93 will return it to neutral position, thereby stopping the table. This rapid reverse movement may obviously be stopped at any point, and in the present example the table would be stopped before reaching the starting position, or in other words, just after the seam 14' has passed the center of the cutter. The operator will then proceed through the cycle of operations just described by putting the table into the power feed and bringing the cutter into operation on the seam 14' by hand feed. Since the power feed of the table is stopped by releasing the treadle 81, the cutter will be automatically elevated. The next seam 14'' may be milled out in a similar manner, this seam requiring a lateral feed of the cutter by operation of the wheel 37 in order to follow the contour of the seam. The spot 15 extends crosswise of the billet at one end thereof, and this milling operation may be accomplished by feeding the table to a position with the spot 15 directly beneath the cutter, then stopping the table feed by throwing the lever 77 into neutral, then while holding the treadle 81 depressed, lowering the cutter into the work-piece by operation of the hand wheel 91 and feeding the cutter laterally by operation of the wheel 37.

From the foregoing illustrations of practical operations, it will be manifest that the present machine is capable of milling out any seams, creases or other blemishes which it is desired to remove before working the billets. It will also be evident that the machine is under such control of the operator that he may with comparative ease, guide the cutter for milling out the various seams and spots. Furthermore, the control is so designed that it is practically impossible for the operator to injure the machine if reasonable care is employed in feeding the tool into the work.

While in the foregoing, I have illustrated and described a mechanically operated means for imparting the several movements, it should be understood that my invention contemplates broadly the provision of any suitable means, whether mechanically, electrically or hydraulically operated for operating and controlling the cutter and work table for the purpose of de-seaming billets, or for performing any milling operation in which similar movements are required. It should be understood, therefore, that the present disclosure is for the purpose of illustration merely, and that considerable change might be made in the provision of mechanism for the purposes intended herein without departing from the spirit and scope of the invention as expressed in the appended claims:

I claim:

1. In a machine for de-seaming billets and the like, the combination with a reciprocable work table, and a milling cutter, of mechanism for propelling the work table at rapid approach and reverse speeds and feed speeds, means for feeding the cutter into the work, and means for rendering said last mentioned means inoperative at all times except when the feed speed of said table propelling mechanism is engaged.

2. In a machine for de-seaming billets and the like, the combination with a reciprocable work table, and a milling cutter, of mechanism for propelling the work table at rapid and feed speeds, manually operable means for feeding the cutter into the work, and means for rendering said manually operable means inoperative at all times except when said feed speed of the table-propelling means is engaged.

3. In a machine for de-seaming billets and the like, the combination of a reciprocable work table, and a milling cutter, of mechanism for feeding the work table past the cutter, means for feeding the cutter into the work, and control mechanism for preventing operation of said cutter-feeding mechanism while the work table is being propelled at a rapid traverse speed but permitting its operation during a feed speed.

4. A machine of the character described, comprising a horizontally reciprocable work table, a vertically and laterally movable work-cutter, power-operated mechanism for transmitting feed and rapid traverse movements to the table and for elevating the cutter, and control means for said mechanism including means whereby the cutter can not be fed into the work-piece while the table is being propelled at said rapid speed.

5. A machine of the character described, comprising a horizontally reciprocable work table, a vertically and laterally movable work-cutter, power-operated mechanism for transmitting feed and rapid traverse movements to the table and for elevating the cutter, manually operable mechanism for feeding the cutter downwardly, control means for said power and manually operable mechanisms, including a control member for causing the table to advance rapidly to the cutter during which said cutter-operating mechanism is inoperative, and a control member for transmitting feed movement to the table and for rendering said manually operable mechanism operative for feeding the cutter into the work.

6. A machine of the character described, comprising a horizontally reciprocable work table, a vertically and laterally movable work-cutter, power-operated mechanism for transmitting feed and rapid traverse movements to the table and for elevating the cutter, manually operable mechanism for feeding the cutter downwardly, control means for said power and manually operable mechanisms, including a control member for causing the table to advance rapidly to the cutter during which said cutter-operating mechanism is inoperative, and a control member for transmitting feed movement to the table and for rendering said manually operable mechanism operative for feeding the cutter into the work, the last mentioned control member being also operable for reversing the travel of the table and for automatically rendering said power-operated mechanism operative for elevating the cutter.

7. In a machine of the character described, the combination with a reciprocable work table and a milling cutter, of mechanism for propelling the table at rapid traverse and feed speeds, mechanism for moving the cutter into the work by hand and for retracting the cutter, and control means for preventing the cutter from being fed into the work until the feed speed of the table is engaged, and for automatically causing the cutter to be retracted by power when the travel of the table is reversed.

8. A machine of the character described comprising a horizontally reciprocable work table, a milling cutter disposed above said table, power-operated mechanism for propelling the table in rapid approach, feed and rapid reverse movements, hand-operated mechanism for lowering the cutter and power-operated mechanism for raising the cutter rendered operative and inoperative by operation of said table-propelling mechanism.

9. A machine of the character described comprising a horizontally reciprocable work table, a milling cutter disposed above said table, power-operated mechanism for propelling the table in rapid approach, feed and rapid reverse movements, hand-operated mechanism for lowering the cutter and power-operated mechanism for raising the cutter, and control means for said mechanisms including a single control member operable for producing said feed speed of the table and for rendering said hand and power-operated mechanisms operative and inoperative.

10. A machine of the character described comprising a horizontally reciprocable work table, a milling cutter disposed above said table, power-operated mechanism for propelling the table in rapid approach, feed and rapid reverse movements, hand-operated mechanism for lowering the cutter and power-operated mechanism for raising the cutter, and control means for said mechanism including a single control member operable for producing said feed speed of the table and for rendering said manually operable means operative for lowering the cutter when said feed speed is engaged and for rendering said power-operated means operative for raising said cutter when said feed speed is stopped.

11. In a machine for de-seaming billets and the like, the combination with a horizontally reciprocable work table, an overhead milling cutter, mechanism for reciprocating said table and for raising and lowering the cutter, and control means for said mechanisms at the front of the machine, comprising a foot lever having treadles at opposite ends, one of which is adapted to be depressed for causing the table to be moved forward at a feed speed and the other of which is adapted to be depressed for propelling the table in the reverse direction, a manually operable wheel adapted to be revolved for feeding the cutter downwardly, and means whereby said manually operable wheel is operative only when said foot treadle is depressed for the feed speed.

12. A milling machine for de-seaming billets comprising in combination with a reciprocable table and an overhead cutter, of mechanism for propelling the table at rapid traverse and feed speeds, mechanism for feeding the cutter into the work and for retracting the cutter, and means whereby the cutter-feeding mechanism is rendered inoperative except when the table-propelling mechanism is in condition for effecting said feed speed.

13. A machine for de-seaming billets comprising a milling cutter, a billet-carrier, manually operated means for feeding the cutter into the billet, power-operated means for retracting the cutter, power-operated means for feeding the billet-carrier past the cutter, and control mechanism for rendering the manually-operated means inoperative except when the carrier feed is engaged.

14. A machine for de-seaming billets comprising a milling cutter, a billet-carrier, manually operated means for feeding the cutter into the billet, power-operated means for retracting the cutter, power operated means for feeding the billet-carrier past the cutter; and control mechanism for preventing operation of said manually operated means until the carrier feed has been engaged and for automatically causing said power-operated means to retract the cutter when said carrier feed has been terminated.

15. A milling machine of the character described comprising a horizontally reciprocable work table, an overhead cutter, mechanism for propelling the table in forward and reverse directions controlled by a foot lever at the front of the machine, mechanism for feeding the cutter downwardly controlled by a hand wheel at the front of the machine, and a hand wheel for feeding said cutter laterally with respect to the work table.

16. A milling machine of the character described comprising a horizontally reciprocable work table, an overhead cutter, mechanism for propelling the table at rapid traverse and feed speeds in one direction and rapid traverse speed in the reverse direction, control means at the front of the machine for said mechanism, mechanism for feeding the table downwardly, and control means for preventing down feed of the cutter except when the table feed is engaged.

17. A milling machine of the character described, a bed, a work table horizontally reciprocable on the bed, an upright housing at the rear of the bed, a spindle saddle vertically movable on said housing, a horizontal cutter spindle in said saddle on an axis transverse to the work table and adjustable axially, power-operated mechanism for propelling the work table at rapid traverse and feed speeds, manually operated mechanism for vertically feeding and power-operated mechanism for elevating said spindle saddle, manually operated mechanism for axially adjusting said spindle, and means whereby a single operator at the front of the machine may control the operation of said cutter and table-operating mechanisms.

FRANK J. MALONE.